(12) United States Patent
Shimura et al.

(10) Patent No.: US 10,854,390 B2
(45) Date of Patent: Dec. 1, 2020

(54) ELECTRONIC COMPONENT WITH INTERPOSER

(71) Applicant: Taiyo Yuden Co., Ltd., Tokyo (JP)

(72) Inventors: Tetsuo Shimura, Tokyo (JP); Yosuke Nakada, Tokyo (JP); Yasuyuki Inomata, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 74 days.

(21) Appl. No.: 16/355,960

(22) Filed: Mar. 18, 2019

(65) Prior Publication Data

US 2019/0287723 A1    Sep. 19, 2019

(30) Foreign Application Priority Data

Mar. 16, 2018  (JP) .................................. 2018-048836

(51) Int. Cl.
  *H01G 4/258* (2006.01)
  *H01G 2/08* (2006.01)
  *H01G 2/06* (2006.01)
  *H01G 4/232* (2006.01)
  *H01G 4/30* (2006.01)

(52) U.S. Cl.
  CPC ............... *H01G 4/258* (2013.01); *H01G 2/06* (2013.01); *H01G 2/08* (2013.01); *H01G 4/232* (2013.01); *H01G 4/30* (2013.01)

(58) Field of Classification Search
  CPC ............ H01G 4/258; H01G 2/08; H01G 2/06; H01G 4/30; H01G 4/232
  See application file for complete search history.

(56) References Cited

U.S. PATENT DOCUMENTS

| | | | | |
|---|---|---|---|---|
| 2004/0066589 | A1* | 4/2004 | Togashi | H05K 1/141 361/15 |
| 2013/0329389 | A1* | 12/2013 | Hattori | H05K 1/141 361/782 |
| 2015/0122534 | A1* | 5/2015 | Park | H01G 2/065 174/260 |
| 2015/0270068 | A1* | 9/2015 | Hattori | H01C 1/14 361/301.4 |
| 2016/0111215 | A1* | 4/2016 | Park | H05K 3/3442 174/260 |
| 2016/0118192 | A1* | 4/2016 | Fujimura | H01G 4/30 174/260 |

FOREIGN PATENT DOCUMENTS

| | | |
|---|---|---|
| JP | 2015-135910 A | 7/2015 |
| JP | 2017-188545 A | 10/2017 |

* cited by examiner

*Primary Examiner* — Eric W Thomas
(74) *Attorney, Agent, or Firm* — CHIP LAW GROUP

(57) ABSTRACT

The present technology provides an electronic component with an interposer, including an electronic component and an interposer. An adhesive section is disposed in an opposing space between a main body of the electronic component and a substrate. When a direction in which first and second external electrodes of the electronic component face each other is a first direction, a direction orthogonal to the first direction is a second direction, and a direction in which the electronic component and the interposer face each other is a third direction, the adhesive section includes a plurality of unitary adhesive sections separated from each other, and the unitary adhesive sections are disposed in a two-dimensional array such that the number of unitary adhesive sections arrayed along the second direction is smaller on opposing sides in the first direction than at a center.

20 Claims, 5 Drawing Sheets

FIG.4
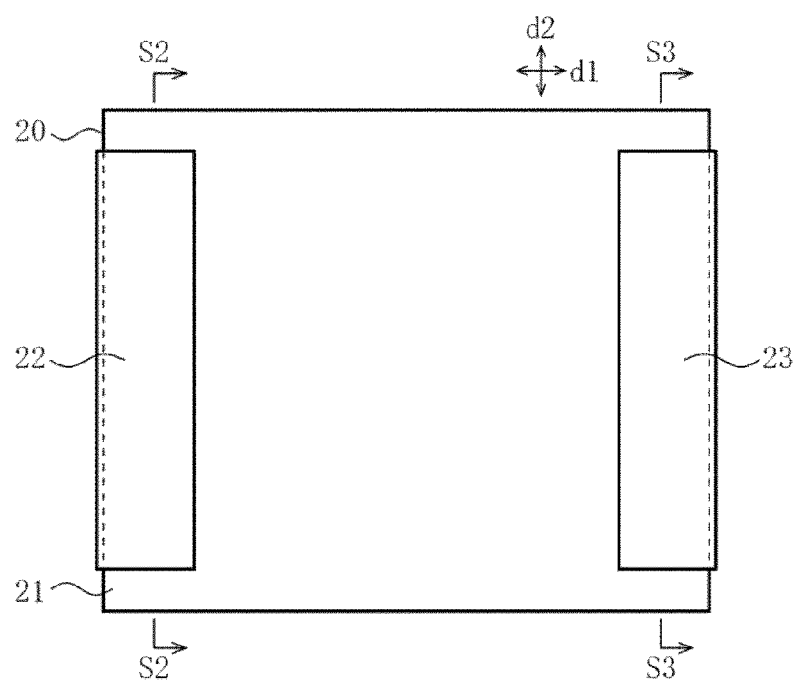
FIG.5A
FIG.5B
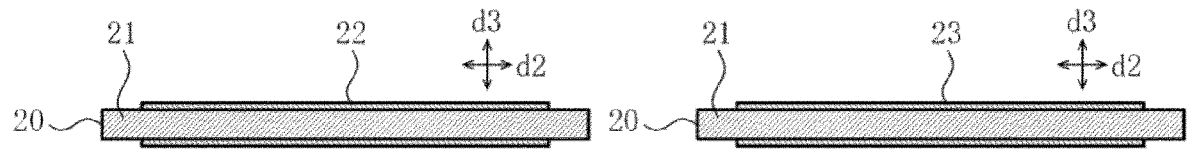

ELECTRONIC COMPONENT WITH INTERPOSER

CROSS REFERENCE TO RELATED APPLICATION

This application is based upon and claims benefit of priority from Japanese Patent Application No. 2018-048836, filed on Mar. 16, 2018, the entire contents of which are incorporated herein by reference.

BACKGROUND

The present technology relates to an electronic component with an interposer, that is, an electronic component mounted on an interposer.

The above-mentioned electronic component with an interposer is disclosed in Japanese Patent Laid-open No. 2015-135910 and Japanese Patent Laid-open No. 2017-188545. The electronic component with an interposer includes the electronic component and the interposer. The electronic component includes a first external electrode and a second external electrode. The first external electrode and the second external electrode are disposed at opposing ends of a main body of the electronic component. The interposer includes a first mounted electrode and a second mounted electrode. The first mounted electrode and the second mounted electrode are disposed at opposing ends of a substrate. Further, the electronic component and the interposer are disposed so that the main body of the electronic component faces the substrate. The first external electrode is connected to the first mounted electrode, and the second external electrode is connected to the second mounted electrode. Moreover, an adhesive section is disposed in an opposing space between the main body of the electronic component and the substrate of the interposer.

Meanwhile, the electronic component with the interposer is mounted on a circuit board when the first and second mounted electrodes of the interposer are connected to conductive pads on the circuit board that are respectively provided for the first and second mounted electrodes by using solder or other bonding agent. Further, after the electronic component with the interposer is mounted on the circuit board, a voltage appropriate for the electronic component is applied to the first and second external electrodes of the electronic component through the conductive pads on the circuit board and the first and second mounted electrodes of the interposer.

When a voltage is applied to the main body of the electronic component (e.g., a multilayer ceramic capacitor, a multilayer ceramic inductor, or a multilayer ceramic varistor), heat is generated in the main body of the electronic component. Therefore, in order to prevent the electronic component, for example, from degrading its characteristics or malfunctioning due to a temperature rise, it is significantly important in practical sense that heat be uniformly transferred from the main body of the electronic component to the interposer.

SUMMARY

The present technology has been made in view of the above circumstances, and provides an electronic component with an interposer that is able to uniformly transfer heat from a main body of the electronic component to the interposer and prevent the electronic component, for example, from degrading its characteristics or malfunctioning due to a temperature rise.

According to an embodiment of the present technology, there is provided an electronic component with an interposer including an electronic component and an interposer. The electronic component includes a first external electrode and a second external electrode. The first external electrode and the second external electrode are disposed at opposing ends of a main body of the electronic component. The interposer includes a first mounted electrode and a second mounted electrode. The first mounted electrode and the second mounted electrode are disposed at opposing ends of a substrate. The electronic component and the interposer are disposed so that the main body of the electronic component faces the substrate. The first external electrode is connected to the first mounted electrode, and the second external electrode is connected to the second mounted electrode. An adhesive section is disposed in an opposing space between the main body of the electronic component and the substrate. When a direction in which the first and second external electrodes of the electronic component face each other is the first direction, a direction orthogonal to the first direction is the second direction, and a direction in which the electronic component and the interposer face each other is the third direction, the adhesive section includes a plurality of unitary adhesive sections separated from each other, and the unitary adhesive sections are two-dimensionally arrayed so that the number of unitary adhesive sections arrayed along the second direction is smaller on opposing sides of the first direction than at the center.

The electronic component with the interposer according to an embodiment of the present technology is able to uniformly transfer heat from the main body of the electronic component to the interposer and prevent the electronic component, for example, from degrading its characteristics or malfunctioning due to a temperature rise.

BRIEF DESCRIPTION OF THE DRAWINGS

FIG. 4 is a plan view of the interposer depicted in FIG. 1;

FIG. 5A is a cross-sectional view of the interposer depicted in FIG. 1 taken along line S2-S2 in FIG. 4;

FIG. 5B is a cross-sectional view of the interposer depicted in FIG. 1 taken along line S3-S3 in FIG. 4;

DETAILED DESCRIPTION OF THE PREFERRED EMBODIMENTS

Figure 1:
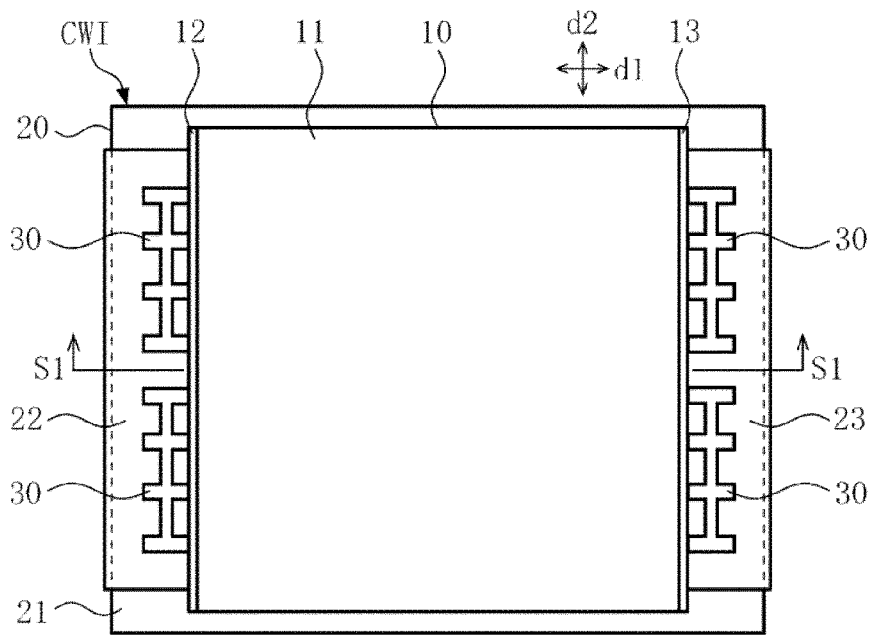
FIG. 1 is a plan view of an electronic component with an interposer to which an embodiment of the present technology is applied.
Figure 2:
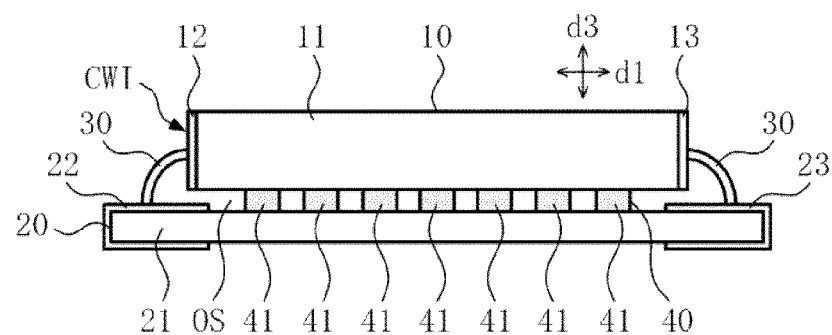
FIG. 2 is a side view of the electronic component with the interposer depicted in FIG. 1 as viewed in a second direction.

For the sake of convenience, the following description assumes that a direction in which a first external electrode 12 and a second external electrode, which are included in an electronic component 10 depicted in FIGS. 1 and 2, face each other (equivalent to the left-right direction in FIGS. 1 and 2) is the "first direction d1," and that a direction orthogonal to the first direction d1 (equivalent to the up-down direction in FIG. 1) is the "second direction d2," and further that a direction in which the electronic component 10 and an interposer 20 face each other (equivalent to the up-down direction in FIG. 2) is the "third direction d3."

First, a configuration of an electronic component with an interposer CWI to which an embodiment of the present technology is applied will be described with reference to FIGS. 1, 2, 3, 4, 5A, 5B and 6.

Figure 6:
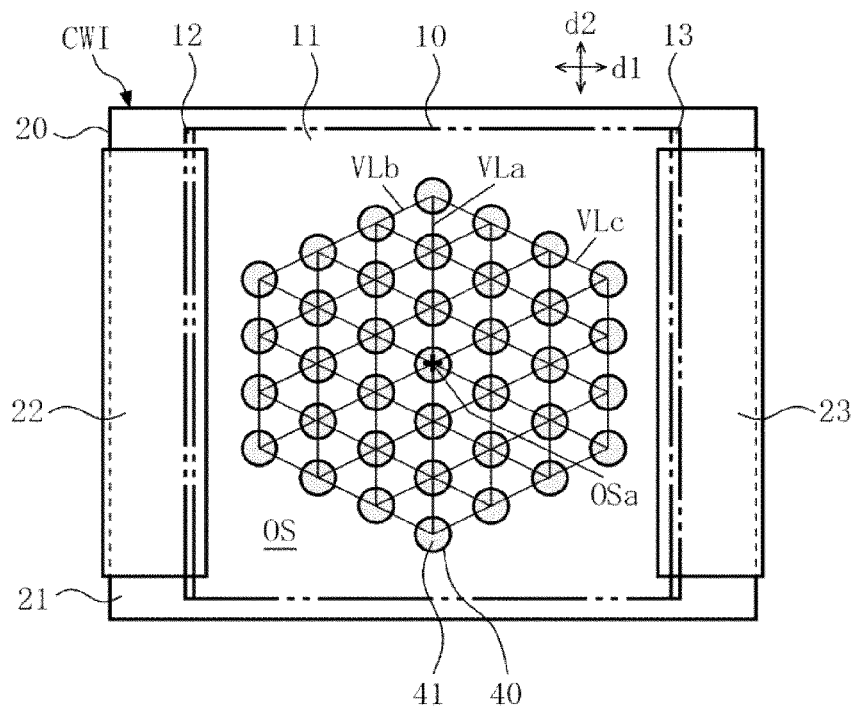
FIG. 6 is a diagram illustrating a two-dimensional array of an adhesive section (a plurality of unitary adhesive sections) in the electronic component with the interposer depicted in FIG. 1.

The electronic component with the interposer CWI depicted in FIGS. 1, 2, 3, 4, 5A, 5B and 6 include an electronic component 10 (a multilayer ceramic capacitor in the figures), an interposer 20, a total of four metal terminals 30, and an adhesive section 40. As illustrated in FIG. 6, the adhesive section 40 includes a plurality of unitary adhesive sections 41 (a total of 37 unitary adhesive sections 41 are depicted) that are separated from each other.

The electronic component 10 includes a main body 11, a first external electrode 12, and a second external electrode 13. The main body 11 is substantially shaped like a rectangular parallelepiped. The first external electrode 12 is disposed at one end in the first direction d1 of the main body 11. The second external electrode 13 is disposed at the other end in the first direction d1 of the main body 11.

Figure 3:
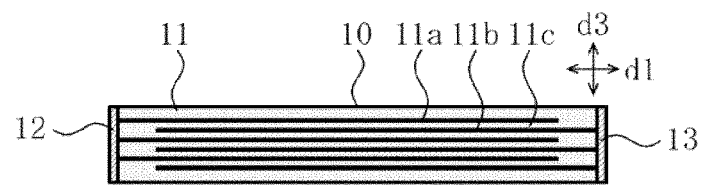
FIG. 3 is a cross-sectional view of the electronic component depicted in FIG. 1 taken along line S1-S1 in FIG. 1.

The main body 11 includes a capacitance section (no reference numeral is assigned). As illustrated in FIG. 3, the capacitance section is formed by alternately stacking a first internal electrode layer 11a and a second internal electrode layer 11b with a dielectric layer 11c positioned in between. The first internal electrode layer 11a is substantially rectangular in shape. The second internal electrode layer 11b is substantially rectangular in shape and is substantially the same size as the first internal electrode layer 11a. Further, opposing surfaces in the third direction d3 of the capacitance section and opposing surfaces in the second direction d2 of the capacitance section are covered by a dielectric margin section (no reference numeral is assigned). The first external electrode 12 is substantially shaped like a rectangle and disposed on one surface in the first direction d1 of the main body 11, the second external electrode 13 is substantially shaped like a rectangle and disposed on the other surface in the first direction d1 of the main body 11. An edge of each first internal electrode layer 11a is connected to the first external electrode 12, and an edge of each second internal electrode layer 11b is connected to the second external electrode 13.

A main element of the main body 11, excluding each first internal electrode layer 11a and each second internal electrode layer 11b, is preferably dielectric ceramic that is selected, for example, from barium titanate, strontium titanate, calcium titanate, magnesium titanate, calcium zirconate, calcium titanate zirconate, barium zirconate, and titanium oxide. A main element of each dielectric layer 11c may differ from a main element of opposing sides in the third direction d3 of the dielectric margin section, and a main element of each dielectric layer 11c, a main element of one side in the third direction d3 of the dielectric margin section, and a main element of the other side in the third direction d3 of the dielectric margin section may differ from each other. A main element of each first internal electrode layer 11a and a main element of each second internal electrode layer 11b is preferably a metal that is selected, for example, from nickel, copper, palladium, platinum, silver, gold, and an alloy of these metals.

FIG. 3 depicts a total of three first internal electrode layers 11a and a total of three second internal electrode layers 11b. However, the total number of first internal electrode layers 11a, the total number of second internal electrode layers 11b, the dimension in the first direction d1 of the first internal electrode layers 11a and second internal electrode layers 11b, the dimension in the second direction d2 of the first internal electrode layers 11a and second internal electrode layers 11b, the thickness of the first internal electrode layers 11a and second internal electrode layers 11b, and the thickness of the dielectric layers 11c may be changed as appropriate depending on a target capacitance value including the dimension in the first direction d1 of the main body 11, the dimension in the second direction d2 of the main body 11, and the dimension in the third direction d3 of the main body 11.

The first external electrode 12 and the second external electrode 13 may be formed as appropriate in a single-layer configuration or in a multi-layer configuration having two or more layers. A main element for the single-layer configuration is preferably a metal that is selected, for example, nickel, copper, palladium, platinum, silver, gold, and an alloy of these metals. When the multi-layer configuration having two or more layers is adopted, a main element of the innermost layer is the same as the main element for the single-layer configuration, a main element of the outermost layer is preferably a metal that is selected, for example, from tin, copper, nickel, gold, zinc, and an alloy of these metals, and a main element of an intermediate layer is preferably a metal that is selected, for example, from copper, tin, nickel, gold, zinc, and an alloy of these metals. For the single-layer configuration and the multi-layer configuration having two or more layers, each layer may be formed as desired by using, for example, a paste baking method, a wet plating method, or a dry plating method.

The interposer 20 includes a substrate 21, a first mounted electrode 22, and a second mounted electrode 23. The substrate 21 is substantially shaped like a rectangular parallelepiped. The first mounted electrode 22 is disposed at one end in the first direction d1 of the substrate 21. The second mounted electrode 23 is disposed at the other end in the first direction d1 of the substrate 21.

A main element of the substrate 21 is preferably an insulator that is selected, for example, from ceramic, such as silicon dioxide, aluminum oxide, silicon nitride, or zirconium oxide, from thermosetting synthetic resin, such as epoxy resin, phenolic resin, polyimide resin, urea resin, melamine resin, unsaturated polyester resin, bismaleimide resin, polyurethane resin, diallyl phthalate resin, silicone resin, or cyanate resin, or from such thermosetting synthetic resin containing a glass filler or other reinforcing filler.

FIG. 1 indicates that the dimensions in the first direction d1 and second direction d2 of the substrate 21 are slightly greater than the dimensions in the first direction d1 and second direction d2 of the electronic component 10. However, at least one of the dimensions in the first direction d1 and second direction d2 of the substrate 21 may be equal or substantially equal to the dimensions in the first direction d1 and second direction d2 of the electronic component 10.

The first mounted electrode 22 consecutively includes a rectangular-shaped portion (no reference numeral is assigned) disposed on one surface in the third direction d3 of the substrate 21, a rectangular-shaped portion (no reference numeral is assigned) disposed on the other surface in the third direction d3 of the substrate 21, and a rectangular-shaped portion disposed on one surface in the first direction d1 of the substrate 21. The dimensions in the second direction d2 of the rectangular-shaped portions are equal or substantially equal to each other.

The second mounted electrode 23 is line-symmetric to the first mounted electrode 22 with respect to a line in the second direction d2 that passes through the center of the dimension in the first direction d1 of the substrate 21. That is, the second mounted electrode 23 consecutively includes a rectangular-shaped portion (no reference numeral is assigned) disposed on one surface in the third direction d3 of the substrate 21, a rectangular-shaped portion (no reference numeral is assigned) disposed on the other surface in the third direction d3 of the substrate 21, and a rectangular-shaped portion disposed on the other surface in the first direction d1 of the substrate 21. The dimensions in the second direction d2 of the rectangular-shaped portions are equal or substantially equal to each other.

Main elements, layer configurations, and formation methods of the first mounted electrode 22 and second mounted electrode 23 may be the same as those of the first external electrode 12 and second external electrode 13 of the electronic component 10, and thus will not be redundantly described.

FIG. 1 indicates that the dimension in the second direction d2 of the first mounted electrode 22 and the dimension in the second direction d2 of the second mounted electrode 23 are smaller than the dimension in the second direction d2 of the first external electrode 12 of the electronic component 10 and the dimension in the second direction d2 of the second external electrode 13. However, the dimension in the second direction d2 of the first mounted electrode 22 and the dimension in the second direction d2 of the second mounted electrode 23 may be equal or substantially equal to the dimension in the second direction d2 of the first external electrode 12 of the electronic component 10 and the dimension in the second direction d2 of the second external electrode 13, or may be greater than the dimension in the second direction d2 of the first external electrode 12 of the electronic component 10 and the dimension in the second direction d2 of the second external electrode 13.

Each of the terminals 30 is integral with a plurality of substantially parallel stripes and entirely curved. Two each of the terminals 30 are disposed on opposing ends in the first direction d1 of the electronic component 10. The two terminals 30 disposed toward the first external electrode 12 are configured so that one end of each stripe is connected to the first external electrode 12 of the electronic component 10 by using solder or other bonding agent (not depicted), and that the other end of each stripe is connected to the first mounted electrode 22 of the interposer 20 by using solder or other bonding agent (not depicted). Meanwhile, the two terminals 30 disposed toward the second external electrode 13 are configured so that one end of each stripe is connected to the second external electrode 13 of the electronic component 10 by using solder or other bonding agent (not depicted), and that the other end of each stripe is connected to the second mounted electrode 23 of the interposer 20 by using solder or other bonding agent (not depicted).

A main element of each terminal 30 is preferably a metal that is selected, for example, from nickel, copper, palladium, platinum, silver, gold, and an alloy of these metals. The bonding agent to be used is preferably solder containing two or more types of metallic elements, namely, tin, copper, silver, nickel, germanium, gold, antimony, bismuth, zinc, gallium, and indium, or preferably, for example, a synthetic resin adhesive made electrically conductive by dispersing silver or gold particles.

A total of four metal terminals 30 are depicted in FIG. 1. However, an alternative is to prepare two metal terminals (not depicted) that are each integrally formed in the second direction d2 by joining two metal terminals 30 disposed in the second direction d2, and dispose the prepared metal terminals on opposing sides in the first direction d1 of the electronic component 10, one on one side and the other on the other side. Meanwhile, FIGS. 1 and 2 indicate that the metal terminals 30 are integral with a plurality of substantially parallel stripes and entirely curved. However, the shape of the metal terminals 30 is not particularly limited as far as the metal terminals 30 connect the first external electrode 12 of the electronic component 10 to the first mounted electrode 22 of the interposer 20 and connect the second external electrode 13 of the electronic component 10 to the second mounted electrode 23 of the interposer 20. As an example, the metal terminals may be disposed on opposing sides in the first direction d1 of the electronic component 10, one on one side and the other on the other side.

As described earlier, the adhesive section 40 includes a plurality of unitary adhesive sections 41 (a total of 37 unitary adhesive sections 41 are depicted) that are separated from each other. As depicted in FIGS. 2 and 6, the total of 37 unitary adhesive sections 41 are disposed in an opposing space OS between the main body 11 of the electronic component 10 and the substrate 21 of the interposer 20 in a two-dimensional array fitting into the opposing space OS (in an array formed in two dimensions in the first direction d1 and second direction d2). Intervals in the third direction d3 of the opposing space OS are uniform or substantially uniform in the two dimensions in the first direction d1 and second direction d2. Further, the plus mark (+) in FIG. 6 indicates the center OSa in the two dimensions in the first direction d1 and second direction d2 of the opposing space OS (a point of intersection between a straight line in the second direction d2 passing through ½ the dimension in the first direction d1 of the opposing space OS and a straight line in the first direction d1 passing ½ the dimension in the second direction d2).

In the two dimensions in the first direction d1 and second direction d2, the outline of each of the unitary adhesive sections 41 is circular or roughly circular, and the two-dimensional areas of the unitary adhesive sections 41 are equal or substantially equal to each other. Further, the unitary adhesive sections 41 are two-dimensionally arrayed so that the number of unitary adhesive sections arrayed along the second direction d2 is smaller on opposing sides in the first direction d1 than at the center in the first direction d1 (including the center OSa of the opposing space OS and an area near the center OSa).

A main element of each of the unitary adhesive sections 41 is preferably an adhesive that is selected, for example, from thermosetting synthetic resin, such as epoxy resin, phenolic resin, polyimide resin, urea resin, melamine resin, unsaturated polyester resin, bismaleimide resin, polyurethane resin, diallyl phthalate resin, silicone resin, or cyanate resin, or from such thermosetting synthetic resin containing a glass filler or other reinforcing filler.

The two-dimensional array of the unitary adhesive sections 41 (the total of 37 unitary adhesive sections 41) depicted in FIG. 6 will now be described in detail.

As illustrated in FIG. 6, the total of 37 unitary adhesive sections 41 are disposed in the opposing space OS between the main body 11 of the electronic component 10 and the substrate 21 of the interposer 20 in a two-dimensional array fitting into the opposing space OS, and preferably disposed in a two-dimensional array fitting into an opposing region between each of the first internal electrode layers 11a and each of the second internal electrode layers 11b that are included in the main body 11 (a region where the first internal electrode layers 11a and the second internal electrode layers 11b oppose each other in the third direction is viewed as the two dimensions in the first direction d1 and second direction d2; no reference numeral is assigned).

The two-dimensional array depicted in FIG. 6 is a staggered array. Each of the total of 37 unitary adhesive sections 41 is disposed so that its two-dimensional center coincides or substantially coincides with the common point of a total of seven first virtual lines VLa, a total of seven second virtual lines VLb, and a total of seven third virtual lines VLc. The first virtual lines VLa are drawn in the second direction d2 and parallel to each other. The second virtual lines VLb are at an acute angle to the first virtual lines VLa, parallel to each other, and inclined left downward. The third virtual lines VLc are at an acute angle to the first virtual lines VLa, parallel to each other, and inclined right downward. Further, the contour of the two-dimensional array (equivalent to an outer shape formed by two outermost first virtual lines VLa, two outermost second virtual lines VLb, and two outermost third virtual lines VLc) is hexagonal in shape.

As regards the total of seven first virtual lines VLa, seven unitary adhesive sections 41 are arrayed along the central first virtual line VLa, six unitary adhesive sections 41 are arrayed along the two first virtual lines VLa on either side of the central first virtual line VLa, five unitary adhesive sections 41 are arrayed along the two first virtual lines VLa on either side of the aforementioned first virtual lines VLa, and four unitary adhesive sections 41 are arrayed in the second direction d2 along the two first virtual lines VLa on either side of the aforementioned first virtual lines VLa. That is, the total of 37 unitary adhesive sections 41 are two-dimensionally arrayed so that the number of unitary adhesive sections 41 arrayed along each first virtual line VLa is smaller on opposing sides than at the center.

Further, as regards the total of seven second virtual lines VLb, seven unitary adhesive sections 41 are arrayed along the central second virtual line VLb, six unitary adhesive sections 41 are arrayed along the two second virtual lines VLb on either side of the central second virtual line VLb, five unitary adhesive sections 41 are arrayed along the two second virtual lines VLb on either side of the aforementioned second virtual lines VLb, and four unitary adhesive sections 41 are arrayed along the two second virtual lines VLb on either side of the aforementioned second virtual lines VLb. Similarly, as regards the total of seven third virtual lines VLc, seven unitary adhesive sections 41 are arrayed along the central third virtual line VLc, six unitary adhesive sections 41 are arrayed along the two third virtual lines VLc on either side of the central third virtual line VLc, five unitary adhesive sections 41 are arrayed along the two third virtual lines VLc on either side of the aforementioned third virtual lines VLc, and four unitary adhesive sections 41 are arrayed along the two third virtual lines VLc on either side of the aforementioned third virtual lines VLc. That is, the total of 37 unitary adhesive sections 41 are two-dimensionally arrayed so that the number of unitary adhesive sections 41 arrayed along each second virtual line VLb is smaller on opposing sides than at the center, and that the number of unitary adhesive sections 41 arrayed along each third virtual line VLc is smaller on opposing sides than at the center.

Meanwhile, in the two dimensions in the first direction d1 and second direction d2, the sum of the two-dimensional areas of the total of 37 unitary adhesive sections 41 is preferably not greater than ½ the two-dimensional area of the opposing space OS, and more preferably not greater than ½ and not smaller than ⅕ the two-dimensional area of the opposing space OS. Further, in the two dimensions in the first direction d1 and second direction d2, the two-dimensional area of each unitary adhesive section 41 is preferably not smaller than 0.5 mm2, and more preferably not smaller than 0.5 mm2 and not greater than 2 mm2. Furthermore, the thickness of each unitary adhesive section 41 (equivalent to the dimension in the third direction d3 and the interval in the third direction d3 of the opposing space OS) is preferably not smaller than 0.05 mm, and more preferably not smaller than 0.05 mm and not greater than 0.85 mm. The reasons will be described later.

An exemplary method of manufacturing the electronic component with the interposer CWI will now be described. It should be noted that the manufacturing method described below is merely an example and does not limit the method of manufacturing the electronic component with the interposer CWI.

Manufacturing is started by preparing the electronic component 10, the interposer 20, and the metal terminals 30. Then, a screen printing, gravure printing, or other printing method is used to print paste for the adhesive section 40 in a region corresponding to the opposing space OS above the substrate 21 of the interposer 20 in order to form a required number of uncured unitary adhesive sections 41. Next, the bottom surface of the main body 11 of the electronic component 10 is mounted on the interposer 20 by pressing it against each of the uncured unitary adhesive sections 41. Each of the uncured unitary adhesive sections 41 is then cured by blowing hot air over it, introducing it into a heating furnace, or by using an appropriate curing method. In this manner, the main body 11 of the electronic component 10 is bonded to the substrate 21 of the interposer 20. Subsequently, the metal terminals 30 and a bonding agent such as solder are used to connect the first external electrode 12 of the electronic component 10 to the first mounted electrode 22 of the interposer 20, and connect the second external electrode 13 of the electronic component 10 to the second mounted electrode 23 of the interposer 20.

An alternative is to connect one end of the metal terminals 30 to the first external electrode 12 and second external electrode 13 of the electronic component 10 by using solder or other bonding agent, mount the bottom surface of the main body 11 of the electronic component 10 on the interposer 20 by pressing it against each of the uncured unitary adhesive sections 41, cure each of the uncured unitary adhesive sections 41, and connect the other ends of the metal terminals 30 to the first mounted electrode 22 and second mounted electrode 23 of the interposer 20 by using solder or other bonding agent.

Operational advantages provided by the electronic component with the interposer CWI will now be described.

First Operational Advantage

The electronic component with the interposer CWI is mounted on a circuit board when solder or other bonding agent is used to connect the first mounted electrode 22 and second mounted electrode 23 of the interposer 20 to conductive pads on the circuit board that are respectively provided for the first and second mounted electrodes. Further, after the electronic component with the interposer CWI is mounted on the circuit board, a voltage appropriate for the electronic component 10 is applied to the first external electrode 12 and second external electrode 13 of the electronic component 10 through the conductive pads on the circuit board and the first mounted electrode 22 and second mounted electrode 23 of the interposer 20.

The main body 11 of the electronic component 10 (a multilayer ceramic capacitor is depicted in the figures) generates heat when a voltage is applied to it. Therefore, in order to prevent the electronic component 10, for example, from degrading its characteristics or malfunctioning due to a temperature rise, it is significantly important in practical sense that heat be uniformly transferred from the main body 11 of the electronic component 10 to the interposer 20.

More specifically, when the main body 11 of the electronic component 10 generates heat, the heat of opposing ends in the first direction d1 of the main body 11 is immediately transferred from the first external electrode 12 and second external electrode 13 to the interposer 20 through the metal terminals 30. Therefore, the temperature distribution of the main body 11 tends to be higher at a portion excluding the opposing ends, particularly at the center, than at the opposing ends. Consequently, in order to transfer the heat of a portion other than the opposing ends in the first direction d1 of the main body 11 to the interposer 20 through the adhesive section 40, it is preferable that the adhesive section 40 be configured to transfer the heat in accordance with the temperature distribution.

The electronic component with the interposer CWI is configured so that the adhesive section 40 disposed in the opposing space OS between the main body 11 of the electronic component 10 and the substrate 21 of the interposer 20 includes the total of 37 unitary adhesive sections 41, which are separated from each other. Further, the total of 37 unitary adhesive sections 41 are disposed in a two-dimensional array so that the number of unitary adhesive sections 41 arrayed along each first virtual line VLa is smaller on opposing sides than at the center (in a two-dimensional array such that the number of unitary adhesive sections 41 arrayed along the second direction d2 is smaller on the opposing sides in the first direction d1 than at the center).

That is, when the heat of a portion other than the opposing ends in the first direction d1 of the main body 11 is transferred to the interposer 20 through the adhesive section 40, the amount of heat transfer is greater at the center in the first direction d1 than on the opposing sides. Therefore, even when the aforementioned temperature distribution occurs in the main body 11, the heat transfer can be achieved based on the temperature distribution. Accordingly, when heat is generated in the main body 11 of the electronic component 10, the heat of the entire main body 11 can be uniformly transferred to the interposer 20. This makes it possible to prevent the electronic component 10, for example, from degrading its characteristics or malfunctioning due to a temperature rise.

Particularly, in a case where the electronic component 10 is a multilayer ceramic capacitor that is likely to have the aforementioned temperature distribution, the temperature of the entire main body 11 can be maintained uniform or substantially uniform to definitely prevent the multilayer ceramic capacitor, for example, from degrading its characteristics or malfunctioning when the heat of the entire main body 11 is uniformly transferred to the interposer 20. Additionally, when the electronic component 10 is a multilayer ceramic capacitor, heat generation due to voltage application occurs mainly in the aforementioned opposing region between each of the first internal electrode layers 11a and each of the second internal electrode layers 11b. Consequently, when the total of 37 unitary adhesive sections 41 are disposed in a two-dimensional array fitting into the opposing region, the heat of the entire main body 11 can be transferred more uniformly to the interposer 20.

Second Operational Advantage

In the electronic component with the interposer CWI, the total of 37 unitary adhesive sections 41 are disposed in a two-dimensional array so that the number of unitary adhesive sections 41 arrayed along each second virtual line VLb is smaller on the opposing sides than at the center, and that the number of unitary adhesive sections 41 arrayed along each third virtual line VLc is smaller on the opposing sides than at the center.

That is, when the heat of a portion other than the opposing ends in the first direction d1 of the main body 11 is transferred to the interposer 20 through the adhesive section 40, the amount of heat transfer is greater at the center in a direction orthogonal to each second virtual line VLb than on the opposing sides and greater at the center in a direction orthogonal to each third virtual line VLc than on the opposing sides. Therefore, even when the aforementioned temperature distribution occurs in the main body 11, the heat transfer can be achieved based on the temperature distribution. Accordingly, when heat is generated in the main body 11 of the electronic component 10, the heat of the entire main body 11 can be transferred more uniformly to the interposer 20.

Third Operational Advantage

In the electronic component with the interposer CWI, the two-dimensional areas of the total of 37 unitary adhesive sections 41 are equal or substantially equal to each other in the two dimensions in the first direction d1 and second direction d2. Therefore, even when the aforementioned temperature distribution occurs in the main body 11, the heat of the entire main body 11 can be transferred more uniformly to the interposer 20 simply by adjusting the intervals between the unitary adhesive sections 41.

Fourth Operational Advantage

In the electronic component with the interposer CWI, the sum of the two-dimensional areas of the total of 37 unitary adhesive sections 41 is not greater than ½ the two-dimensional area of the opposing space OS, and preferably not greater than ½ and not smaller than ⅕ the two-dimensional area of the opposing space OS in the two dimensions in the first direction d1 and second direction d2. That is, if the sum of the two-dimensional areas of the total of 37 unitary adhesive sections 41 is greater than ½ the two-dimensional area of the opposing space OS, peeling may occur particularly in unitary adhesive sections near the first external electrode 12 and the second external electrode 13 when thermal expansion or contraction occurs in the main body 11 of the electronic component 10. However, such peeling is unlikely to occur as far as the sum of the two-dimensional areas of the total of 37 unitary adhesive sections 41 is not greater than ½ the two-dimensional area of the opposing space OS. Further, if the sum of the two-dimensional areas of the total of 37 unitary adhesive sections 41 is smaller than ⅕ the two-dimensional area of the opposing space OS, the adhesive force between the main body 11 of the electronic component 10 and the substrate 21 of the interposer 20 may be insufficient. However, such adhesive force insufficiency is unlikely to result as far as the sum of the two-dimensional areas of the total of 37 unitary adhesive sections 41 is not smaller than ⅕ the two-dimensional area of the opposing space OS.

Fifth Operational Advantage

In the electronic component with the interposer CWI, the two-dimensional area of each of the total of 37 unitary adhesive sections 41 is not smaller than 0.5 mm2 and preferably not smaller than 0.5 mm2 and not greater than 2 mm2 in the two dimensions in the first and second directions. That is, if the two-dimensional area of each of the total of 37 unitary adhesive sections 41 is smaller than 0.5 mm2, the adhesive force between the main body 11 of the electronic component 10 and the substrate 21 of the interposer 20 may be insufficient. However, such adhesive force insufficiency is unlikely to result as far as the two-dimensional area of each of the total of 37 unitary adhesive sections 41 is not smaller than 0.5 mm2. Further, if the two-dimensional area of each of the total of 37 unitary adhesive sections 41 is greater than 2 mm2, peeling may occur particularly in unitary adhesive sections near the first external electrode 12 and the second external electrode 13 when thermal expansion or contraction occurs in the main body 11 of the electronic component 10. However, such peeling is unlikely to occur as far as the two-dimensional area of each of the total of 37 unitary adhesive sections 41 is not greater than 2 mm2.

Sixth Operational Advantage

In the electronic component with the interposer CWI, the thickness of each of the total of 37 unitary adhesive sections 41 (equivalent to the dimension in the third direction d3 and the interval in the third direction d3 of the opposing space OS) is not smaller than 0.05 mm, and more preferably not smaller than 0.05 mm, and preferably not smaller than 0.05 mm and not greater than 0.85 mm. That is, if the thickness of each of the total of 37 unitary adhesive sections 41 is smaller than 0.05 mm, the interval in the third direction d3 of the opposing space OS becomes small. This makes it difficult to obtain a heat release effect based on the flow of air in the second direction d2 of the opposing space OS. However, the heat release effect is properly obtained as far as the thickness of each of the total of 37 unitary adhesive sections 41 is not smaller than 0.05 mm. Further, if the thickness of each of the total of 37 unitary adhesive sections 41 is greater than 0.85 mm, heat transfer may be obstructed in each of the unitary adhesive sections 41 in a case where the thermal conductivity of the unit adhesive section 41 is low. However, the heat transfer is unlikely to be obstructed as far as the thickness of each of the total of 37 unitary adhesive sections 41 is not greater than 0.85 mm.

Exemplary modifications of the two-dimensional array of the unitary adhesive sections 41 in the electronic component with the interposer CWI will now be described with reference to FIGS. 7 to 11.

First Exemplary Modification

Figure 7:
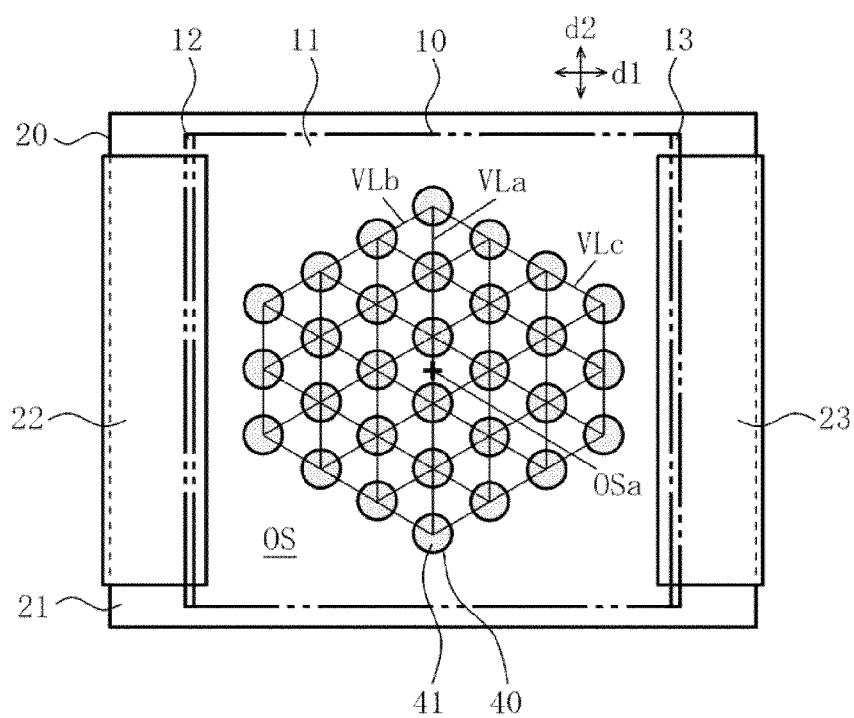
FIG. 7 is a view corresponding to FIG. 6 and illustrating a first exemplary modification of the two-dimensional array depicted in FIG. 6.

FIG. 7 illustrates a first exemplary modification. The two-dimensional array illustrated in FIG. 7 differs in the following points from the earlier-described two-dimensional array of the unitary adhesive sections 41 in the electronic component with the interposer CWI (see FIG. 6).

The total number of unitary adhesive sections 41 is 30, and the two-dimensional area of each unitary adhesive section 41 is increased with a decrease in the total number.

As regards the total of seven first virtual lines VLa, six unitary adhesive sections 41 are arrayed along the central first virtual line VLa, five unitary adhesive sections 41 are arrayed along the two first virtual lines VLa on either side of the central first virtual line VLa, four unitary adhesive sections 41 are arrayed along the two first virtual lines VLa on either side of the aforementioned first virtual lines VLa, and three unitary adhesive sections 41 are arrayed along the two first virtual lines VLa on either side of the aforementioned first virtual lines VLa.

There are a total of six second virtual lines VLb and a total of six third virtual lines VLc. Six unitary adhesive sections 41 are arrayed along the two central second virtual lines VLb and along the two central third virtual lines VLb. Five unitary adhesive sections 41 are arrayed along the two second virtual lines VLb on either side of the aforementioned second virtual lines VLb and along the two third virtual lines VLc on either side of the aforementioned third virtual lines VLc. Four unitary adhesive sections 41 are arrayed along the two second virtual lines VLb on either side of the aforementioned second virtual lines VLb and along the two third virtual lines VLc on either side of the aforementioned third virtual lines VLc.

The unitary adhesive sections 41 do not overlap with the center OSa of the opposing space OS.

Even when the two-dimensional array according to the first exemplary modification is used, the same operational advantages as the earlier-described first to sixth operational advantages are obtained.

Second Exemplary Modification

Figure 8:
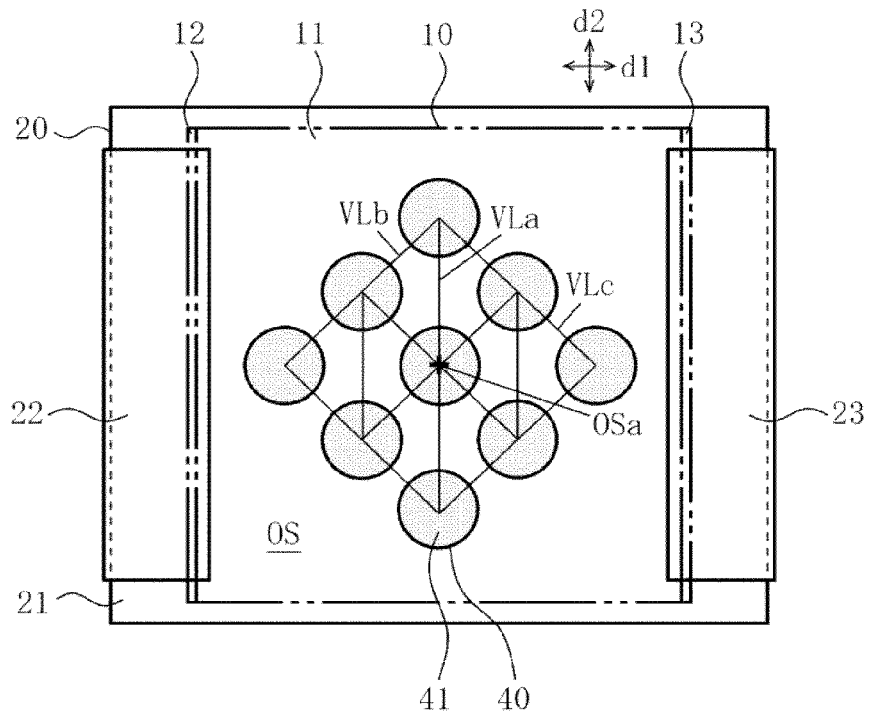
FIG. 8 is a view corresponding to FIG. 6 and illustrating a second exemplary modification of the two-dimensional array depicted in FIG. 6.

FIG. 8 illustrates a second exemplary modification. The two-dimensional array illustrated in FIG. 8 differs in the following points from the earlier-described two-dimensional array of the unitary adhesive sections 41 in the electronic component with the interposer CWI (see FIG. 6).

The total number of unitary adhesive sections 41 is nine, and the two-dimensional area of each unitary adhesive section 41 is increased with a decrease in the total number.

There are a total of three first virtual lines VLa. Three unitary adhesive sections 41 are arrayed along the central first virtual line VLa. Two unitary adhesive sections 41 are arrayed along the two first virtual lines VLa on either side of the aforementioned first virtual line VLb. One unitary adhesive section 41 is disposed on opposing sides in the first direction d1 of the aforementioned two unitary adhesive sections 41.

There are a total of three second virtual lines VLb and a total of three third virtual lines VLc. Three unitary adhesive sections 41 are arrayed along each of the second virtual lines VLb and each of the third virtual lines VLc.

The contour of the two-dimensional array (equivalent to an outer shape formed by two outermost second virtual lines VLb and two outermost third virtual lines VLc) is quadrangular in shape.

Even when the two-dimensional array according to the second exemplary modification is used, the same operational advantages as the earlier-described first to sixth operational advantages are obtained. The second operational advantage is obtained when the number of unitary adhesive sections 41 arrayed along the first direction d1 is smaller on the opposing sides in the second direction d2 than at the center while three unitary adhesive sections 41 are arrayed along each of the second virtual lines VLb and along each of the third virtual lines VLc.

Third Exemplary Modification

Figure 9:
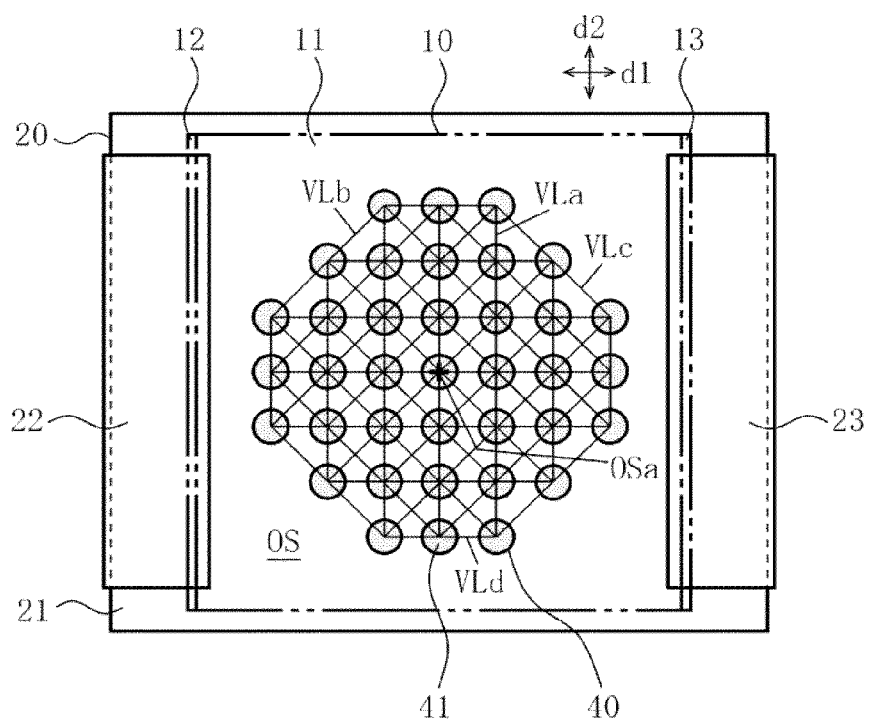
FIG. 9 is a view corresponding to FIG. 6 and illustrating a third exemplary modification of the two-dimensional array depicted in FIG. 6.

FIG. 9 illustrates a third exemplary modification. The two-dimensional array illustrated in FIG. 9 differs in the following points from the earlier-described two-dimensional array of the unitary adhesive sections 41 in the electronic component with the interposer CWI (see FIG. 6).

The two-dimensional array is a lattice-like arrangement of a total of 37 unitary adhesive sections 41.

Each of the total of 37 unitary adhesive sections 41 is disposed so that its two-dimensional center coincides or substantially coincides with the common point of a total of seven first virtual lines VLa in the second direction d2 and parallel to each other, a total of nine second virtual lines VLb at an acute angle to each first virtual line VLa and parallel to each other, a total of nine third virtual lines VLc at an acute angle to each first virtual line VLa, parallel to each other, and inclined right downward, and a total of seven fourth virtual lines VLd in the first direction d1 and parallel to each other.

As regards the total of seven first virtual lines VLa, seven unitary adhesive sections 41 are arrayed along three central first virtual lines VLa, five unitary adhesive sections 41 are arrayed along the two first virtual lines VLa on either side of the aforementioned central first virtual lines VLa, and three unitary adhesive sections 41 are arrayed along the two first virtual lines VLa on either side of the aforementioned first virtual lines VLa.

As regards the total of nine second virtual lines VLb and the total of nine third virtual lines VLc, five unitary adhesive sections 41 are arrayed along the central second virtual line VLb and along the central third virtual line VLc, four unitary adhesive sections 41 are arrayed along the two second virtual lines VLb on either side of the aforementioned central second virtual line VLb and along the two third virtual lines VLc on either side of the aforementioned central third virtual line VLc, five unitary adhesive sections 41 are arrayed along the two second virtual lines VLb on either side of the aforementioned second virtual lines VLb and along the two third virtual lines VLc on either side of the aforementioned third virtual lines VLc, four unitary adhesive sections 41 are arrayed along the two second virtual lines VLb on either side of the aforementioned second virtual lines VLb and along the two third virtual lines VLc on either side of the aforementioned third virtual lines VLc, and three unitary adhesive sections 41 are arrayed along the two second virtual lines VLb on either side of the aforementioned second virtual lines VLb and along the two third virtual lines VLc on either side of the aforementioned third virtual lines VLc.

As regards the total of seven fourth virtual lines VLd, seven unitary adhesive sections 41 are arrayed along three central fourth virtual lines VLd, five unitary adhesive sections 41 are arrayed along the two fourth virtual lines VLd on either side of the aforementioned central fourth virtual lines VLd, and three unitary adhesive sections 41 are arrayed along the two fourth virtual lines VLd on either side of the aforementioned fourth virtual lines VLd.

The contour of the two-dimensional array (equivalent to an outer shape formed by two outermost first virtual lines VLa, two outermost second virtual lines VLb, two outermost third virtual lines VLc, and two outermost fourth virtual lines VLd) is octagonal in shape.

That is, in the two-dimensional array illustrated in FIG. 9, the total of 37 unitary adhesive sections 41 are two-dimensionally arrayed so that the number of unitary adhesive sections 41 arrayed along each first virtual line VLa is smaller on the opposing sides than at the center, and that the number of unitary adhesive sections 41 arrayed along each fourth virtual line VLd is smaller on the opposing sides than at the center.

Even when the two-dimensional array according to the third exemplary modification is used, the same operational advantages as the earlier-described first to sixth operational advantages are obtained. The second operational advantage is obtained when the number of unitary adhesive sections 41 arrayed along the first direction d1 is smaller on the opposing sides in the second direction d2 than at the center.

Fourth Exemplary Modification

Figure 10:
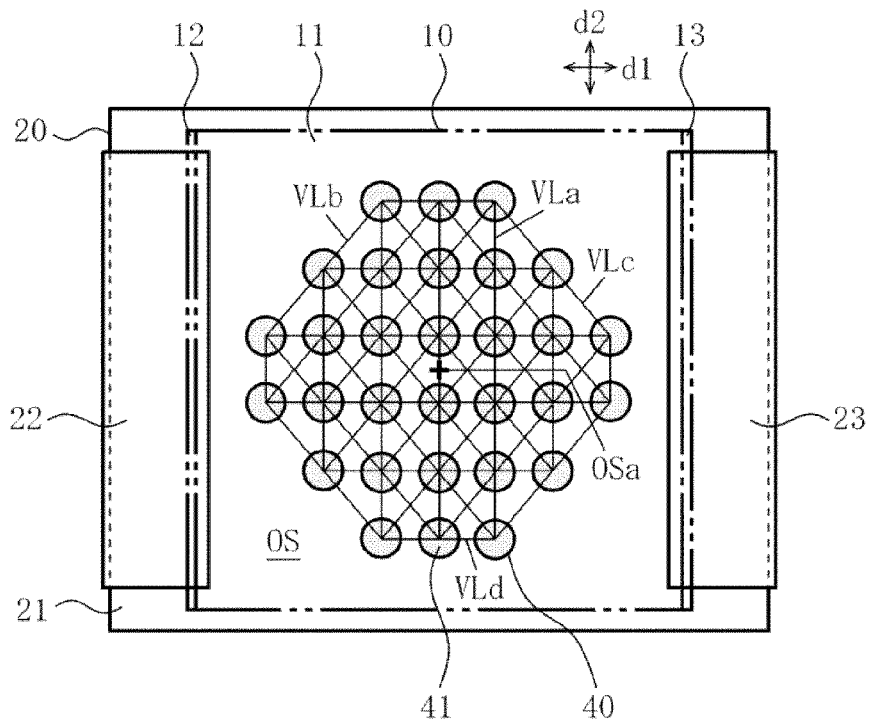
FIG. 10 is a view corresponding to FIG. 6 and illustrating a fourth exemplary modification of the two-dimensional array depicted in FIG. 6.

FIG. 10 illustrates a fourth exemplary modification. The two-dimensional array illustrated in FIG. 10 is more similar to the two-dimensional array according to the third exemplary modification depicted in FIG. 9 than to the earlier-described two-dimensional array of the unitary adhesive sections 41 in the electronic component with the interposer CWI (see FIG. 6). Therefore, the difference from the two-dimensional array according to the third exemplary modification depicted in FIG. 9 will now be described in order to facilitate understanding of the fourth exemplary modification.

The two-dimensional array depicted in FIG. 10 differs in the following points from the two-dimensional array depicted in FIG. 9.

The total number of unitary adhesive sections 41 is 30, and the two-dimensional area of each unitary adhesive section 41 is increased with a decrease in the total number.

As regards the total of seven first virtual lines VLa, six unitary adhesive sections 41 are arrayed along three central first virtual lines VLa, four unitary adhesive sections 41 are arrayed along the two first virtual lines VLa on either side of the aforementioned central first virtual lines VLa, and two unitary adhesive sections 41 are arrayed along the two first virtual lines VLa on either side of the aforementioned first virtual lines VLa.

There are a total of eight second virtual lines VLb and a total of eight third virtual lines VLc. Four unitary adhesive sections 41 are arrayed along six central second virtual lines VLb and along six central third virtual lines VLb. Three unitary adhesive sections 41 are arrayed along the two second virtual lines VLb on either side of the aforementioned second virtual lines VLb and along the two third virtual lines VLc on either side of the aforementioned third virtual lines VLc.

There are a total of six fourth virtual lines VLd. Seven unitary adhesive sections 41 are arrayed along two central fourth virtual lines VLd. Five unitary adhesive sections 41 are arrayed along the two fourth virtual lines VLb on either side of the aforementioned central fourth virtual lines VLd. Three unitary adhesive sections 41 are arrayed along the two fourth virtual lines VLb on either side of the aforementioned fourth virtual lines VLd.

The unitary adhesive sections 41 do not overlap with the center OSa of the opposing space OS.

That is, in the two-dimensional array illustrated in FIG. 10, the total of 30 unitary adhesive sections 41 are two-dimensionally arrayed so that the number of unitary adhesive sections 41 arrayed along each first virtual line VLa is smaller on the opposing sides than at the center, and that the number of unitary adhesive sections 41 arrayed along each fourth virtual line VLd is smaller on the opposing sides than at the center.

Even when the two-dimensional array according to the fourth exemplary modification is used, the same operational advantages as the earlier-described first to sixth operational advantages are obtained. The second operational advantage is obtained when the number of unitary adhesive sections 41 arrayed along the first direction d1 is smaller on the opposing sides in the second direction d2 than at the center.

Fifth Exemplary Modification

Figure 11:
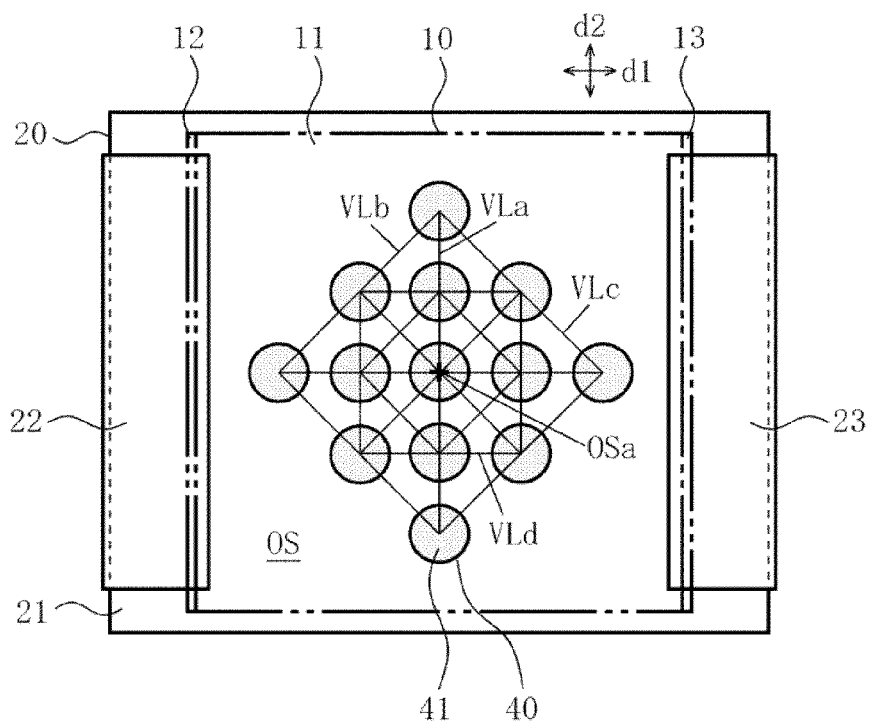
FIG. 11 is a view corresponding to FIG. 6 and illustrating a fifth exemplary modification of the two-dimensional array depicted in FIG. 6.

FIG. 11 illustrates a fifth exemplary modification. The two-dimensional array illustrated in FIG. 11 is more similar to the two-dimensional array according to the third exemplary modification depicted in FIG. 9 than to the earlier-described two-dimensional array of the unitary adhesive sections 41 in the electronic component with the interposer CWI (see FIG. 6). Therefore, the difference from the two-dimensional array according to the third exemplary modification depicted in FIG. 9 will now be described in order to facilitate understanding of the fifth exemplary modification.

The two-dimensional array depicted in FIG. 11 differs in the following points from the two-dimensional array depicted in FIG. 9.

The total number of unitary adhesive sections 41 is 13, and the two-dimensional area of each unitary adhesive section 41 is increased with a decrease in the total number.

There are a total of three first virtual lines VLa. Five unitary adhesive sections 41 are arrayed along the central first virtual line VLa. Three unitary adhesive sections 41 are arrayed along the two first virtual lines VLa on either side of the aforementioned first virtual line VLb. One unitary adhesive section 41 is disposed on opposing sides in the first direction d1 of the aforementioned three unitary adhesive sections 41.

There are a total of four second virtual lines VLb and a total of four third virtual lines VLc. Three unitary adhesive sections 41 are arrayed along the central second virtual line VLb and along the central third virtual line VLc. Two unitary adhesive sections 41 are arrayed along the two second virtual lines VLb on either side of the aforementioned second virtual line VLb and along the two third virtual lines VLc on either side of the aforementioned third virtual line VLc. Three unitary adhesive sections 41 are arrayed along the two second virtual lines VLb on either side of the aforementioned second virtual lines VLb and along the two third virtual lines VLc on either side of the aforementioned third virtual lines VLc.

There are a total of three fourth virtual lines VLd. Five unitary adhesive sections 41 are arrayed along the central fourth virtual line VLd. Three unitary adhesive sections 41 are arrayed along the two fourth virtual lines VLd on either side of the aforementioned fourth virtual line VLd. One unitary adhesive section 41 is disposed on opposing sides in the second direction d2 of the aforementioned three unitary adhesive sections 41.

The contour of the two-dimensional array (equivalent to an outer shape formed by two outermost second virtual lines VLb and two outermost third virtual lines VLc) is quadrangular in shape.

That is, in the two-dimensional array illustrated in FIG. 11, the total of 13 unitary adhesive sections 41 are two-dimensionally arrayed so that the number of unitary adhesive sections 41 arrayed along each first virtual line VLa is smaller on the opposing sides than at the center, and that the number of unitary adhesive sections 41 arrayed along each fourth virtual line VLd is smaller on the opposing sides than at the center.

Even when the two-dimensional array according to the fifth exemplary modification is used, the same operational advantages as the earlier-described first to sixth operational advantages are obtained. The second operational advantage is obtained when the number of unitary adhesive sections 41 arrayed along the second direction d2 is smaller on the opposing sides in the second direction d2 than at the center.

Alternative embodiments of the electronic component with the interposer CWI (including the above-described first to fifth exemplary modifications) will now be described.

(1) The unitary adhesive sections 41 depicted in FIGS. 1, 2, 3, 4, 5A, 5B and 6, and FIGS. 7 to 11 are such that their outline in the two dimensions in the first direction d1 and second direction d2 is circular or roughly circular. However, the outline may alternatively be, for example, rectangular (including square) or roughly rectangular or oval or roughly oval.

(2) FIGS. 1, 2, 3, 4, 5A, 5B and 6, and FIGS. 7 to 11 indicate that the maximum total number of unitary adhesive sections 41 is 37. However, the maximum total number may alternatively be greater than 37 including a case where the two-dimensional area of the opposing space OS is great.

(3) FIGS. 1, 2, 3, 4, 5A, 5B and 6 depict a multilayer ceramic capacitor as the electronic component 10. However, the electronic component 10 may alternatively be an electronic component other than a multilayer ceramic capacitor, such as a multilayer ceramic inductor or a multilayer ceramic varistor, as far as the main body 11 generates heat when a voltage is applied to it.

(4) FIGS. 1, 2, 3, 4, 5A, 5B and 6 indicate that the first external electrode 12 and second external electrode 13 of the electronic component 10 are formed of a rectangular-shaped portion. However, alternative forms may be adopted as far as the first external electrode 12 and the second external electrode 13 can be connected to the interposer 20. The alternative forms include, for example, a form in which the aforementioned rectangular-shaped portion is contiguous to a rectangular-shaped portion on at least either one surface or the other surface in the third direction of the main body 11, and a form in which the aforementioned rectangular-shaped portion, a rectangular-shaped portion on one surface and the other surface in the third direction of the main body 11, and a rectangular-shaped portion on one surface and the other surface in the second direction of the main body 11 are contiguous to one another.

(5) FIGS. 1, 2, 3, 4, 5A, 5B and 6 indicate that the first mounted electrode 22 and second mounted electrode 23 of the interposer 20 are formed of three rectangular-shaped portions. However, an alternative form may be adopted as far as the first mounted electrode 22 and the second mounted electrode 23 can be connected to the electronic component 10 and mounted on the circuit board. For example, the alternative form may be such that the rectangular-shaped portions on one surface and the other surface in the first direction d1 of the substrate 21 are eliminated, and that the two rectangular-shaped portions on one surface and the other surface in the third direction d3 of the substrate 21 are connected with a conductive via.

(6) FIGS. 1, 2, 3, 4, 5A, 5B and 6 indicate that the first external electrode 12 and second external electrode 13 of the electronic component 10 are connected to the first mounted electrode 22 and second mounted electrode 23 of the interposer 20 by using the metal terminals 30 and a bonding agent such as solder. However, an alternative is to eliminate the metal terminals 30 and connect the first external electrode 12 and second external electrode 13 of the electronic component 10 to the first mounted electrode 22 and second mounted electrode 23 of the interposer 20 by using only a bonding agent such as solder.

(7) FIGS. 1, 2, 3, 4, 5A, 5B and 6 indicate that the electronic component with the interposer CWI is formed by mounting one electronic component 10 on the interposer 20. However, the present technology is also applicable to an electronic component with an interposer that is formed by mounting two or more electronic components 10 of the same type or of different types on the interposer 20.

The present disclosure contains subject matter related to that disclosed in Japanese Priority Patent Application JP 2018-048836 filed in the Japan Patent Office on Mar. 16, 2018, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

What is claimed is:

1. An electronic component with an interposer, comprising:
    an electronic component that includes a first external electrode and a second external electrode, the first external electrode and the second external electrode being disposed at opposing ends of a main body of the electronic component; and
    an interposer that includes a first mounted electrode and a second mounted electrode, the first mounted electrode and the second mounted electrode being disposed at opposing ends of a substrate,
    the electronic component and the interposer being disposed such that the main body of the electronic component faces the substrate,
    the first external electrode being connected to the first mounted electrode,
    the second external electrode being connected to the second mounted electrode,
    an adhesive section being disposed in an opposing space between the main body of the electronic component and the substrate, wherein
    when a direction in which the first and second external electrodes of the electronic component face each other is the first direction, a direction orthogonal to the first direction is the second direction, and a direction in which the electronic component and the interposer face each other is the third direction,
    the adhesive section includes a plurality of unitary adhesive sections separated from each other, and
    the unitary adhesive sections are disposed in a two-dimensional array such that the number of unitary adhesive sections arrayed along the second direction is smaller on opposing sides in the first direction than at a center.

2. The electronic component with the interposer according to claim 1, wherein
    the unitary adhesive sections are disposed in a two-dimensional array such that the number of unitary adhesive sections arrayed along the first direction is smaller on opposing sides in the second direction than at a center.

3. The electronic component with the interposer according to claim 1, wherein
    the two-dimensional array is a staggered array.

4. The electronic component with the interposer according to claim 3, wherein
    a contour of the two-dimensional array is a polygon with at least four angles.

5. The electronic component with the interposer according to claim 3, wherein
    a contour of the two-dimensional array is a hexagon.

6. The electronic component with the interposer according to claim 3, wherein
    the total number of the unitary adhesive sections is at least nine.

7. The electronic component with the interposer according to claim 1, wherein
    the two-dimensional array is a lattice-like array.

8. The electronic component with the interposer according to claim 7, wherein
    a contour of the two-dimensional array is a polygon with at least four angles.

9. The electronic component with the interposer according to claim 7, wherein
    a contour of the two-dimensional array is an octagon.

10. The electronic component with the interposer according to claim 7, wherein
    the total number of the unitary adhesive sections is at least thirteen.

11. The electronic component with the interposer according to claim 1, wherein,
    in two dimensions in the first and second directions, the two-dimensional areas of the unitary adhesive sections are equal or substantially equal to each other.

12. The electronic component with the interposer according to claim 1, wherein,
    in two dimensions in the first and second directions, a sum of the two-dimensional areas of the unitary adhesive sections is not greater than ½ the two-dimensional area of the opposing space.

13. The electronic component with the interposer according to claim 1, wherein,
    in two dimensions in the first and second directions, a sum of the two-dimensional areas of the unitary adhesive sections is not greater than ½ and not smaller than ⅕ the two-dimensional area of the opposing space.

14. The electronic component with the interposer according to claim 1, wherein,
    in two dimensions in the first and second directions, the two-dimensional area of each of the unitary adhesive sections is not smaller than 0.5 mm$^2$.

15. The electronic component with the interposer according to claim 1, wherein,
   in two dimensions in the first and second directions, the two-dimensional area of each of the unitary adhesive sections is not smaller than 0.5 mm² and not greater than 2 mm².

16. The electronic component with the interposer according to claim 1, wherein
   a dimension in the third direction of each of the unitary adhesive sections is not smaller than 0.05 mm.

17. The electronic component with the interposer according to claim 1, wherein
   a dimension in the third direction of each of the unitary adhesive sections is not smaller than 0.05 mm and not greater than 0.85 mm.

18. The electronic component with the interposer according to claim 1, wherein
   the first external electrode is connected to the first mounted electrode by using metal terminals and a bonding agent; and
   the second external electrode is connected to the second mounted electrode by using metal terminals and a bonding agent.

19. The electronic component with the interposer according to claim 1, wherein
   the first external electrode is connected to the first mounted electrode by using a bonding agent; and
   the second external electrode is connected to the second mounted electrode by using a bonding agent.

20. The electronic component with the interposer according to claim 1, wherein
   the electronic component is a multilayer ceramic capacitor.

* * * * *